(12) United States Patent
Ono

(10) Patent No.: US 7,978,382 B2
(45) Date of Patent: Jul. 12, 2011

(54) COMPUTER READABLE MEDIUM RECORDING A CALIBRATION PROGRAM, CALIBRATION METHOD, AND CALIBRATION SYSTEM FOR DETECTING PATCH POSITIONS DURING ACQUISITION OF CALORIMETRIC VALUES FROM A PATCH SHEET

(75) Inventor: Satoru Ono, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 635 days.

(21) Appl. No.: 11/487,390

(22) Filed: Jul. 17, 2006

(65) Prior Publication Data

US 2007/0024928 A1 Feb. 1, 2007

(30) Foreign Application Priority Data

Jul. 29, 2005 (JP) ................................ 2005-219752
Mar. 29, 2006 (JP) ................................ 2006-090363

(51) Int. Cl.
*H04N 1/46* (2006.01)

(52) U.S. Cl. ...................................................... 358/504

(58) Field of Classification Search .................. 358/1.9, 358/500, 504, 518, 521, 523; 382/162, 167
See application file for complete search history.

(56) References Cited

U.S. PATENT DOCUMENTS 5,642,202 A * 6/1997 Williams et al. .............. 358/406
6,512,845 B1 * 1/2003 Haikin et al. ................. 382/165
6,628,426 B2 * 9/2003 Denton et al. ................. 358/1.9
6,888,648 B2 * 5/2005 Odagiri et al. ................ 358/1.9
2004/0085378 A1 * 5/2004 Sievert et al. .................. 347/19

FOREIGN PATENT DOCUMENTS

JP 4-087454 A 3/1992
JP 8-009178 A 1/1996

* cited by examiner

*Primary Examiner* — Benny Q Tieu
*Assistant Examiner* — Jeremiah A Bryar
(74) *Attorney, Agent, or Firm* — Sughrue Mion, PLLC

(57) ABSTRACT

A computer readable medium records a calibration program, which causes a control device to execute calibration processing of reading as image data a patch sheet output from an image formation device, having a plurality of patch patterns formed as images based on different density-gradation value data for each color, acquiring calorimetric values for each of the patch patterns from the read-out image data, and adjusting the density of the image formation device based on the density-gradation values and the acquired calorimetric values for each of the patch patterns. The program causes the control device to execute displaying the read-out image data of the patch sheet, detecting and displaying the position of each of the patch patterns in the image data of the patch sheet, and acquiring the calorimetric values for each the patch pattern based on the displayed patch pattern positions, in response to confirmation input by a user of the displayed patch pattern position.

5 Claims, 11 Drawing Sheets

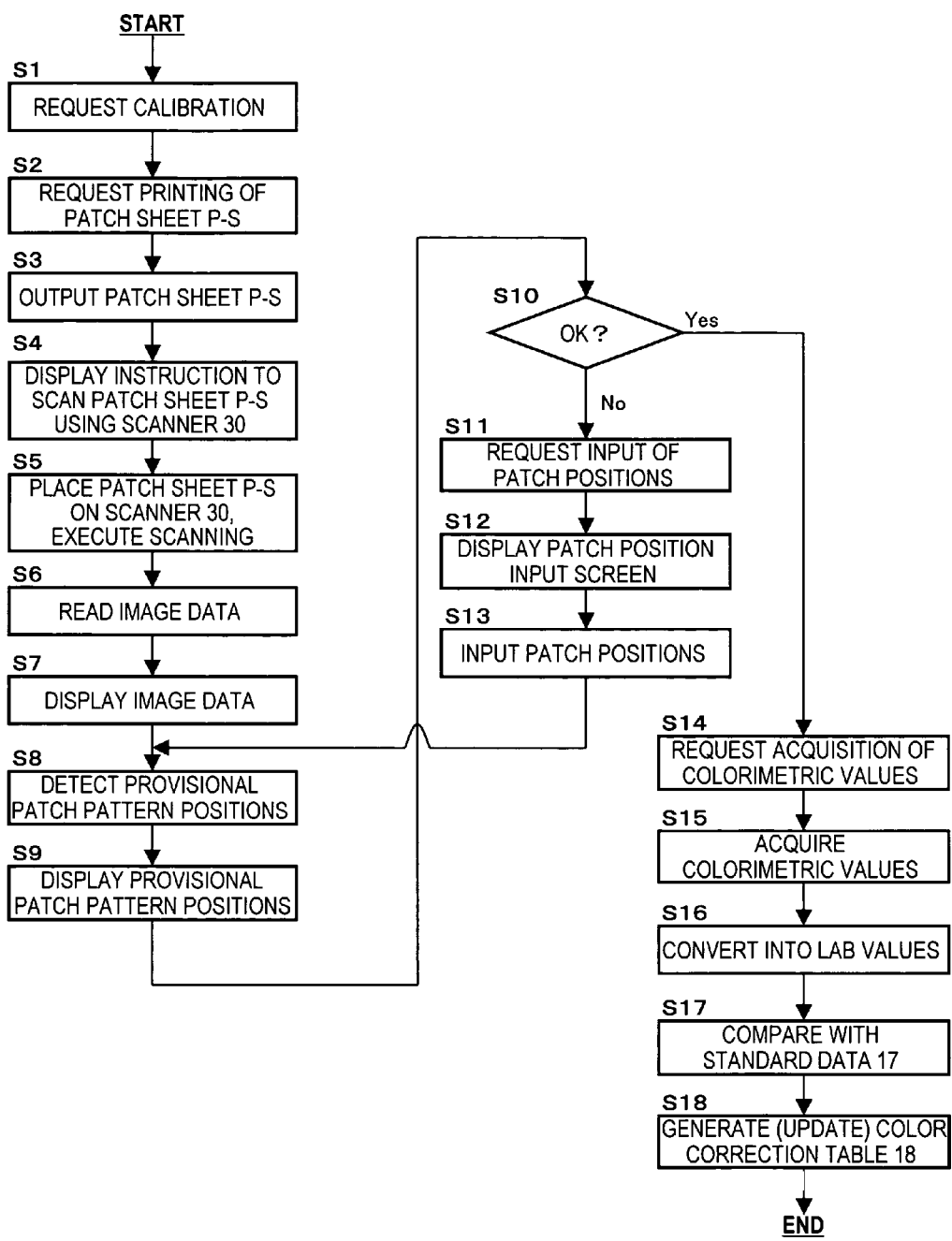

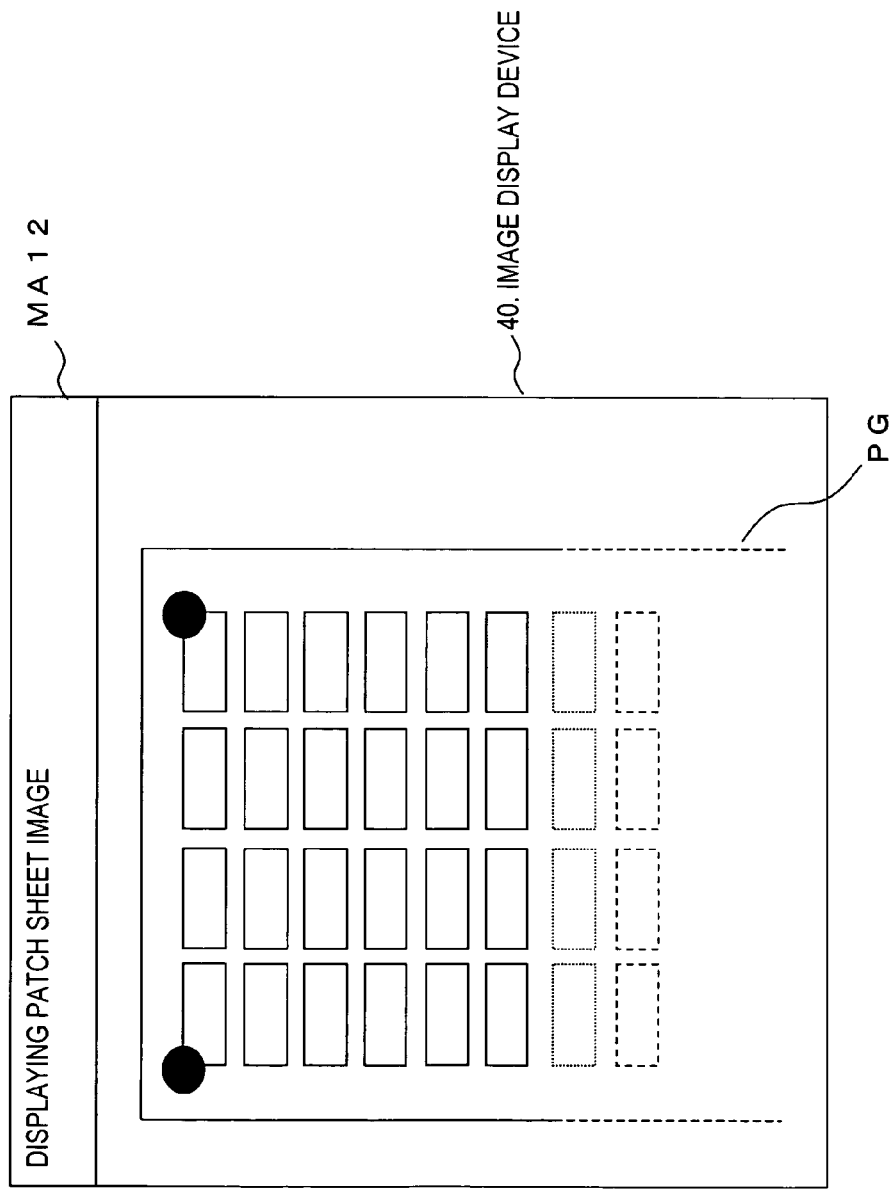

COMPUTER READABLE MEDIUM RECORDING A CALIBRATION PROGRAM, CALIBRATION METHOD, AND CALIBRATION SYSTEM FOR DETECTING PATCH POSITIONS DURING ACQUISITION OF CALORIMETRIC VALUES FROM A PATCH SHEET

CROSS-REFERENCE TO RELATED APPLICATIONS

This application is based upon and claims the benefit of priority from the prior Japanese Patent Application No. 2005-219752, filed on Jul. 29, 2005 and the prior Japanese Patent Application No. 2006-90363, filed on Mar. 29, 2006, the entire contents of which are incorporated herein by reference.

BACKGROUND OF THE INVENTION

1. Field of the Invention

This invention relates to a computer readable medium recording a calibration program or the like to adjust the output density of an image formation device, and in particular, relates to a computer readable medium recording a calibration program or the like which is able to accurately detect patch positions during acquisition of calorimetric values from a patch sheet performed in the calibration, to enable execution of calibration with higher precision than in the prior art.

2. Description of the Related Art

In general, ink is dispensed or toner is provided for printing media in a printer or other image formation device based on image data represented by density-gradation values for different colors. Image formation processing is performed on each of the density-gradation values in this image data such that the density (color values) in the image actually formed on the printing media are prescribed reference values (target values). Normally there are differences between individual printers or other image formation devices, and there are also differences between devices in the relations between the above-described density-gradation values and the color values actually output (the density characteristics). Hence at the time of device shipment, color correction information (for example, a color correction table) is determined according to the density characteristic for the device, and during image formation, color correction based on this color correction information is performed for each density-gradation value of the image data used in image formation.

However, when used in such an image formation device, changes with the environment and aging of various portions occur, and changes in the state of the engine and other portions which actually perform image formation on printing media occur. This is accompanied by changes in the above-described density characteristic, and so to maintain the output result at the above-described target values, the initial color correction information must be adjusted appropriately.

Hence in the prior art, calibration of image formation devices has been performed. One such method uses a patch sheet. In this method, for each of the colors of the color material (toner or ink) used in the image formation device, a patch sheet, on which are printed a plurality of patch patterns in which the gradation values of image data are varied, is output. The densities (calorimetric values) of each of the patch patterns on the patch sheet are measured, and the color correction information (for example, a color correction table) is updated such that, for the gradation value of each patch, the difference between the target values and the measured value is corrected.

In calibration using such patch sheets, during color measurements of each of the above-described patch patterns, of course in order to accurately execute calibration it is essential that the color and gradation values at which each of the patch patterns printed on a sheet have been generated be correctly recognized. In particular, when using an inexpensive and simple scanner rather than using precise calorimetric equipment for color measurements of patch patterns, after reading a patch sheet as image data, the positions in the image data of patch patterns printed at different gradation values for different colors must be accurately detected.

As patch pattern position detection methods for this purpose, as for example disclosed in Japanese Patent Laid-open No. 8-9178 and Japanese Patent Laid-open No. 4-87454, methods have been proposed in which marker patches having color/gradation values easily recognized from patch patterns are used, and in which marker patches are first detected, and the positions of patch patterns are detected from the relative positional relations with marker patches.

However, when a scanner is used in color measurements of each patch pattern on a patch sheet, a human sets the patch sheet on the scanner, and so the patch sheet may be tilted or shifted with respect to the prescribed position on the scanner. In this case, when the output from the image formation device is quite thin (light), even when using the above-described marker patch method of the prior art, the marker patch itself, or the position of the marker patch cannot be accurately detected, and detection of the positions of the above-described patch patterns becomes inaccurate.

When position detection becomes inaccurate in this way, the measured density of the patch pattern for some gradation value may be erroneously regarded as a different gradation value, or color measurement may be performed for portions other than patch patterns, and so of course the calibration precision is reduced.

SUMMARY

Hence an object of this invention is to provide a computer readable medium recording a calibration program to adjust the output density of an image formation device, which can accurately detect each patch position during acquisition of calorimetric values from a patch sheet during this calibration, and can execute calibration with higher precision than in methods of the prior art.

In order to attain the above object, according to an aspect of the invention, a computer readable medium recording a calibration program, which causes a control device to perform calibration processing of reading as image data a patch sheet, output from an image formation device, having a plurality of patch patterns formed as images based on different density-gradation value data for each color, acquiring colorimetric values for each of the patch patterns from the read-out image data, and adjusting the density of the image formation device based on the density-gradation values and the acquired calorimetric values for each of the patch patterns, causes the control device to execute displaying the read-out image data of the patch sheet; detecting and displaying the position of each patch pattern in the image data of the patch sheet; and, acquiring the calorimetric value for each patch pattern based on the displayed patch pattern positions, in response to confirmation input by a user of the displayed positions of patch patterns. Hence by means of the invention, the positions of patch patterns detected by the control device can be confirmed by the user on a display screen, and after confirming that patch pattern positions have been accurately detected, the user can issue an instruction to acquire the calorimetric values. Hence reduction of calibration precision due to failures in patch pattern position detection can be avoided.

In a preferred mode of the above invention, after the detecting and displaying the position, the program further causes the control device to execute displaying a screen for receiving input from the user to modify the displayed patch pattern positions in response to the instruction of the user, and detecting and displaying again the position of each of the patch patterns, based on input by the user at the screen displayed.

In a preferred mode of the above invention, the patch sheet comprises a marker patch which serves as reference in detection of the positions of patch patterns, and input by the user at the screen displayed is input of the position of the marker patch in the image data of the patch sheet.

In a preferred mode of the above invention, the screen displayed for receiving input has at least two areas for different display ranges both of which display image data for the patch sheet.

In a preferred mode of the above invention, in the processing of the acquiring the calorimetric values, the patch patterns are displayed to the user, and the display mode of the patch patterns is changed according to the state of progress of processing.

In order to attain the above object, according to another aspect of the invention, a calibration system has an image formation portion, which outputs a patch sheet having a plurality of patch patterns formed as images based on different density-gradation value data for each color, a patch sheet readout portion, which reads the patch sheet as image data, and a calibration portion which displays said read-out image data for patch sheet, detects and displays the position of each the patch pattern in the image data, acquires calorimetric values for each the patch pattern based on the displayed positions of the patch patterns in response to confirmation input by a user of the displayed positions of the patch patterns, and performs density adjustment of the image formation portion based on the density-gradation values and the colorimetric values acquired for each said patch pattern.

In order to attain the above object, according to another aspect of the invention, a calibration method, in which a patch sheet output from an image formation device, having a plurality of patch patterns formed as images based on different density-gradation value data for each color, is read as image data, calorimetric values are acquired for each the patch pattern from the read-out image data, and based on said density-gradation values and the acquired calorimetric values for each the patch pattern, density adjustment of the image formation device is performed, has displaying to a user the read-out image data of the patch sheet, detecting and displaying to the user the position of each the patch pattern in the image data of the patch sheet, and acquiring calorimetric values for each the patch pattern based on the displayed position of the patch pattern, in response to confirmation input by the user of the displayed positions of the patch patterns.

Further objects and features of the invention will become clear from the following explanations of embodiments of the invention.

BRIEF DESCRIPTION OF THE DRAWINGS

FIG. 4 is a flowchart showing an example of the processing procedure during calibration;

FIG. 5 shows an example of a display screen when an image display device 40 displays image data for a patch sheet P-S;

DESCRIPTION OF THE PREFERRED EMBODIMENTS

Figure 1:
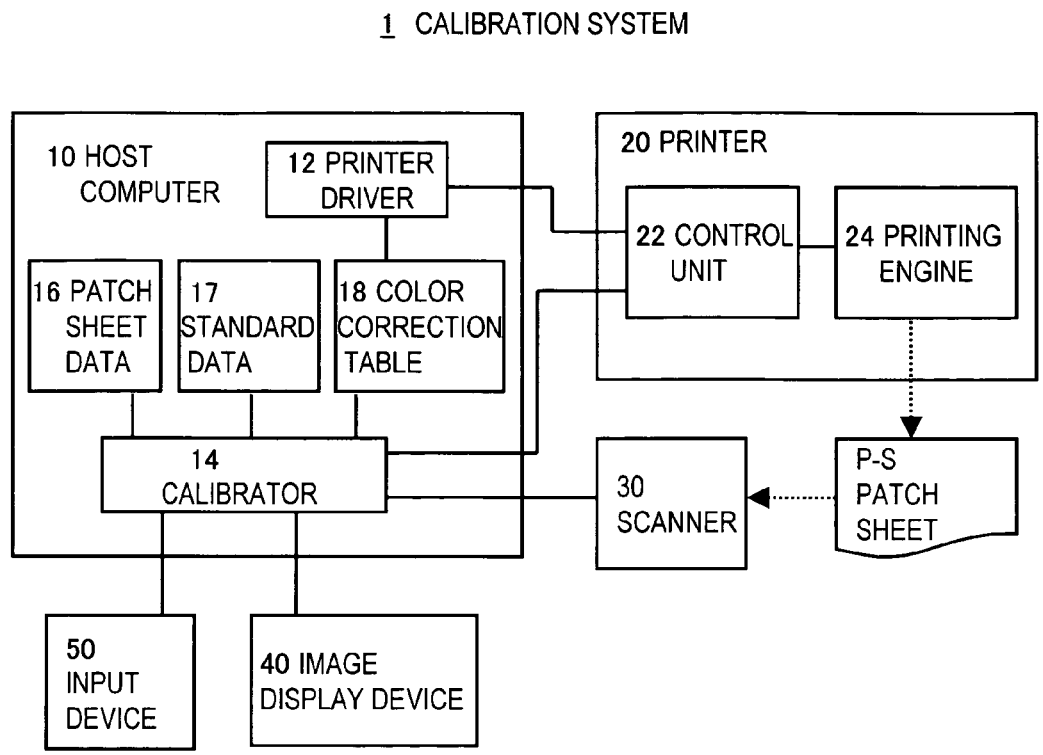
FIG. 1 shows in summary the configuration of an embodiment of a calibration system to which the present invention is applied.

Below, embodiments of the invention are explained, referring to the drawings. However, the technical scope of the invention is not limited to these aspects, but extends to the inventions described in the scope of claims, and to inventions equivalent thereto.

FIG. 1 shows in summary the configuration of an embodiment of a calibration system to which the invention is applied. The calibration system 1 shown in FIG. 1 is the system of this embodiment, and comprises a calibrator 14, which handles the main processing for calibration; a printer 20, which is the object for calibration; and a scanner 30, for color measurements. In this calibration system 1, the scanner 30 reads an output patch sheet P-S, and thereafter a color correction table 18 is updated based on the calorimetric values read out for each patch pattern PP; an interface is provided for modification and confirmation by the user of detected positions of the read-out patch patterns PP; and through error-free position detection, calibration is performed with higher precision than in the prior art.

As explained above, the calibration system 1 comprises a host computer 10, including an image display device 40 and input device 50, a printer 20, and a scanner 30. The host computer 10 is connected by cables to the printer 20 and scanner 30, but may instead by connected via a network, not shown.

The host computer 10 is configured from a personal computer, and comprises a CPU, RAM, ROM, hard disk (data recording means), and similar, not shown. As the user interface, the host computer 10 has the image display device 40 and the input device 50, which is a keyboard, mouse, or other device. As the input device 50, instead of a mouse, a trackball or other pointing device may be used.

As shown in FIG. 1, the host computer 10 comprises a printer driver 12, calibrator 14, patch sheet data 16, standard data 17, and color correction table 18.

The printer driver 12 is a driver for the printer 20, which upon a request for printing issued from the host computer 10 to the printer 20, generates printing data for the printer 20, transmits the data to the printer 20, and issues printing instructions. The printer driver 12 comprises a program which describes processing procedures, and the CPU or similar which executes processing according to this program.

The calibrator 14 is a portion to perform calibration of the printer 20, and is a characteristic portion of this calibration system 1. This calibrator 14 executes processing to receive calibration requests from the user, issue instructions for output of a patch sheet P-S, acquire image data for a patch sheet P-S read by the scanner 30, acquire calorimetric values for each patch pattern PP, and update the color correction table 18. In detection of the positions of patch patterns PP necessary when acquiring the calorimetric value for each patch pattern PP, the image data for the patch sheet P-S and the detected positions are displayed to the user for confirmation, and if necessary the user performs modification operations. This is a major characteristic of this calibrator 14, and is described in greater detail below. The calibrator 14 comprises a program which describes a processing procedure and a CPU or similar which executes processing according to the program, and may be installed as a single module in the above-described printer driver 12. This program may be installed on the host computer 10 from a CD or other recording media on which it is stored, or may be downloaded to the host computer 10 from a prescribed site via the Internet or another network.

The patch sheet data 16 is printing data for the patch sheet P-S which is output from the printer 20 at the time of calibration, and is recorded to ROM or a hard disk. The patch sheet data 16 is data having, for each pixel, a gradation value for each color, and is here assumed to comprise each gradation value (0 to 255) for each of the colors C (cyan), M (magenta), Y (yellow), and K (black) of the color materials (toners) used by the printer 20.

The standard data 17 is data indicating the densities (color values) which should actually be output for each of the gradation values of image data, and is recorded in ROM or on a hard disk. Here, the above gradation values are expressed as gradation values for each of the CMYK colors, and the densities (color values) are represented as Lab values. Hence the L, a, and b values are each prescribed for each of the gradation values for C, for example. This standard data 17 is compared, as reference values (target values) for calibration, with calorimetric results for the patch sheet P-S.

The color correction table 18 is a table which stores information to perform correction according to the density characteristic of the printer 20 in which, at the time of a request for printing by the above-described printer driver 12, the color information of the image data which is to be printed is corrected such that output (printing results) appropriate to the color information is obtained, or in other words, the densities represented by the standard data 17 are expressed. Here, the table associates each gradation value of each CMYK color in the original image data with a corrected gradation value. In this embodiment, the results of calibration are reflected in this color correction table 18.

Figure 2:
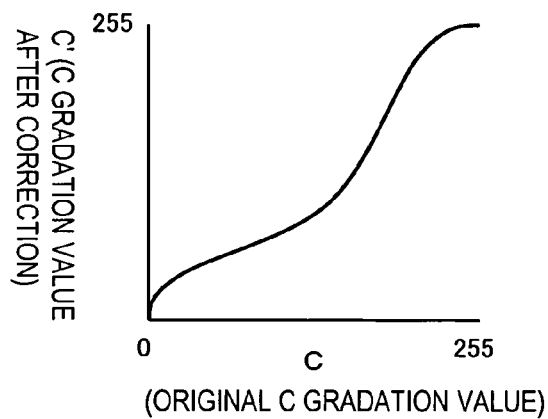
FIG. 2 is a drawing used to explain the color correction table 18.

FIG. 2 is a drawing used to explain this color correction table 18. In FIG. 2, the color correction table for the color C is represented by a graph; the horizontal axis indicates the original C gradation value (C), and the vertical axis indicates the C gradation value after correction (C'). The curve in the figure shows the relation between C and C'; gradation values for C in the original image data are corrected based on the correspondence relation represented by this curve. Similar color correction tables are also prepared for each of the MYK colors. The color correction tables 18 are stored in RAM or on a hard disk.

The printer 20 is the image formation device which is the object of calibration; the printer is here a laser printer, but may be an inkjet printer or any other type of printer. As shown in FIG. 1, the printer 20 comprises a control unit 22 and a printing engine 24.

The control unit 22 is a so-called controller which, upon receiving a printing request from the host computer 10, performs prescribed processing of the received printing data and uses this data as data for the printing engine 24 to issue an instruction for printing to the printing engine 24. During calibration processing, the control unit 22 receives patch sheet data 16 and executes similar processing. The control unit 22 comprises a CPU, RAM, ROM, and ASIC, and similar.

The printing engine 24 is a portion which performs printing onto printing media based on data (signals) supplied from the control unit 22. During calibration processing, the printing engine 24 outputs a patch sheet P-S according to an instruction from the control unit 22. The printing engine 24 comprises an electrostatic unit, an exposure unit, a developing device, a transfer unit, and similar. Cartridges housing toner in each of the CMYK colors are mounted in the developing device.

Figure 3:
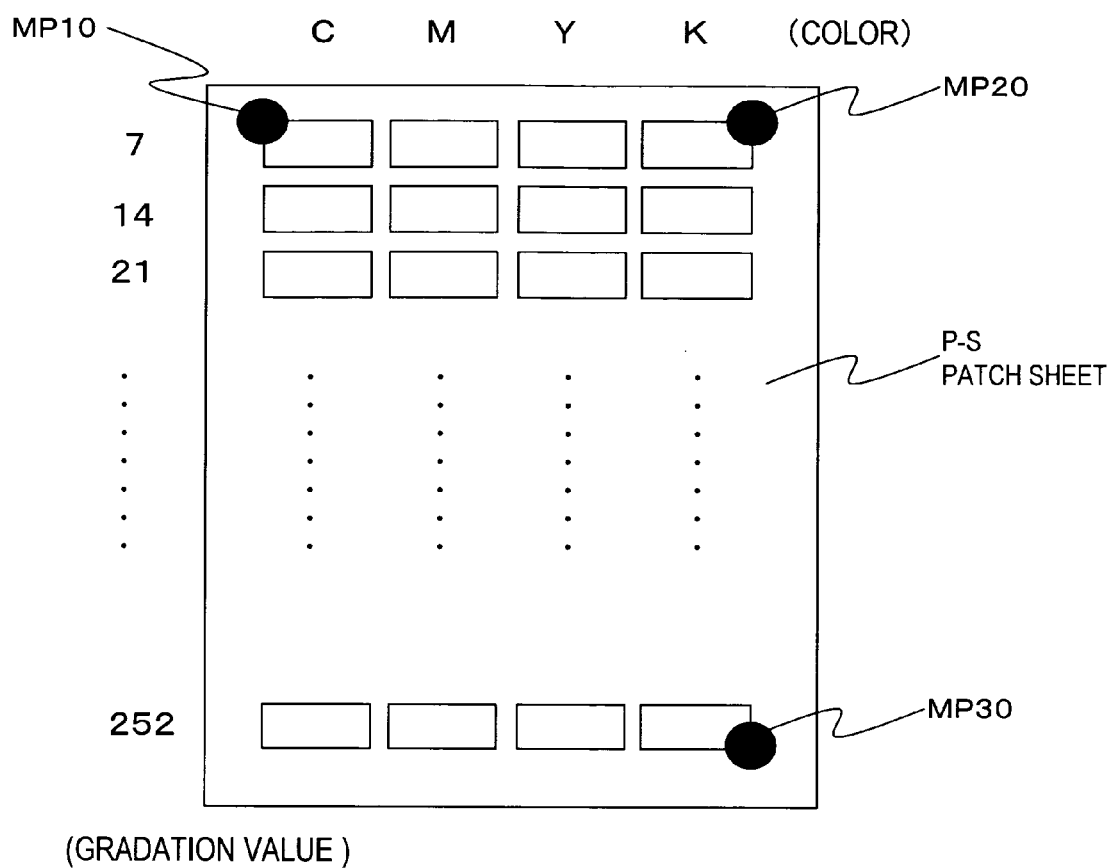
FIG. 3 shows an example of a patch sheet P-S.

An output patch sheet P-S is a sheet output by the printer 20 with a plurality of patch patterns, the gradation values of the image data of which are varied, for each color of the color material (toner) used by the printer 20. FIG. 3 shows an example of a patch sheet P-S. In the example of FIG. 3, patch patterns are printed in four columns for each of the CMYK colors, and patch patterns (shown as rectangles) output with various gradation values are included for each color (column). In the example shown, whereas each color is represented in 256 gradations, from 0 to 255, the patch patterns are output with gradations changed by seven gradation values at a time. This manner of change is one example; other methods are possible. In FIG. 3, the images represented by black circles are marker patches MP10 to MP30, and have colors and/or density values enabling easy recognition and discrimination from the patch patterns.

The scanner 30 is a device which reads a patch sheet P-S in this calibration system 1; a scanner with a widely used design is employed. As explained above, the scanner is connected by a cable to the host computer 10, and is under the control of the calibrator 14. During calibration processing, the scanner reads a patch sheet P-S positioned by the user, and supplies the image data for the patch sheet to the calibrator 14.

Below, the specific processing procedure in this calibration system 1, having the configuration described above, is explained.

First, processing by the printer 20 during normal printing is explained. In the host computer 10, when the printer driver 12 receives a printing request from an application which is a printing request source, the printer driver 12 first converts the image data for printing from the format in which the data was received into intermediate code. Then, expansion processing of the intermediate code is performed, and the code is converted into data comprising, for each pixel, R (red), G (green), and B (blue) gradation values (RGB data). This RGB data is color-converted into CMYK data used by the printer 20 (CMYK data). Then, the CMYK data is corrected based on the above-described color correction table 18, and the corrected data (C'M'Y'K' data) is compressed and transmitted to the printer 20.

The control unit 22 of the printer 20 stores the received data, and then, with timing synchronized with operation of the printing engine 24, reads and decompresses the stored data, and after performing screening processing, transmits the data to the printing engine 24. At the printing engine 24, image formation on the printing media is executed using the different toners, based on the transmitted signals.

Processing at the time of normal printing is performed as described above, but the above-described content is one example, and other processing content can be adopted if the color correction processing resulting from the calibration described below can be executed in the processing content. For example, processing up to screening or processing equivalent thereto can be executed by the host computer 10; conversely, expansion processing and subsequent processing can be executed by the printer 20.

Next, the procedure of calibration processing which is a characteristic portion of this system 1 is explained. FIG. 4 is a flowchart showing an example of the processing procedure during calibration. First, the user employs the input device 50 to issue a request for calibration execution to the calibrator 14 of the host computer 10 (step S1). Upon receiving this request, the calibrator 14 reads the patch sheet data 16 described above, transmits the data to the printer 20, and issues a request for printing of a patch sheet P-S (step S2).

At the printer 20, the patch sheet data 16 is received, processing similar to that described above for normal printing is executed, and a patch sheet P-S is output (step S3). As a result, a patch sheet P-S similar to that shown in FIG. 3 is output from the printer 20.

On the other hand, at the host computer 10 the calibrator 14 displays on the image display device 40 a message indicating that the output patch sheet P-S should be placed on the scanner 30 and scanned (step S4). The user then places the patch sheet P-S at a prescribed position on the scanner 30 according to this message, and issues an instruction to execute scanning (step S5). This instruction may be issued by using the input device 50 to press an instruction button displayed on the image display device 40 by the calibrator 14, or may be issued by using an operation portion (not shown) provided on the scanner 30. As a result of this instruction, the scanner 30 scans the patch sheet P-S and acquires the image data.

Next, the calibrator 14 reads the image data of the patch sheet P-S acquired by the scanner 30 (step S6), and displays the read-out image data on the image display device 40 (step S7). FIG. 5 shows an example of the display screen when displaying the image data on the image display device 40. As shown in FIG. 5, the patch sheet image PG is displayed on the screen, and the user can visually confirm the read-out patch sheet P-S. Further, a display area MA12 may be provided at a position which does not overlap with the patch sheet image PG, so that "Displaying patch sheet image" or similar and the state of processing can also be displayed. By this means, the user can grasp the state of progress of processing.

To describe in detail the processing up to display of this patch sheet image PG, first, when reading out data using the scanner 30, the image is represented as scanner RGB signals. Upon acquiring these signals, the calibrator 14 utilizes color management functions comprised by the OS or similar to convert the signals into device-independent Lab signals or XYZ signals, and then converts these into RGB signals for the image display device 40, and outputs the signals to the image display device 40.

After displaying the patch sheet image PG in this way, the calibrator 14 detects the provisional patch pattern positions (step S8). In this processing, for example, the image positions of the above-described marker patches MP10 to MP30 which serve as reference for the position of the patch sheet P-S are detected, and based on the positional relations from these marker patches, the patch pattern positions are detected. When reliable position detection is not possible, for example, a default position is used as a provisional patch pattern position.

Figure 6A:
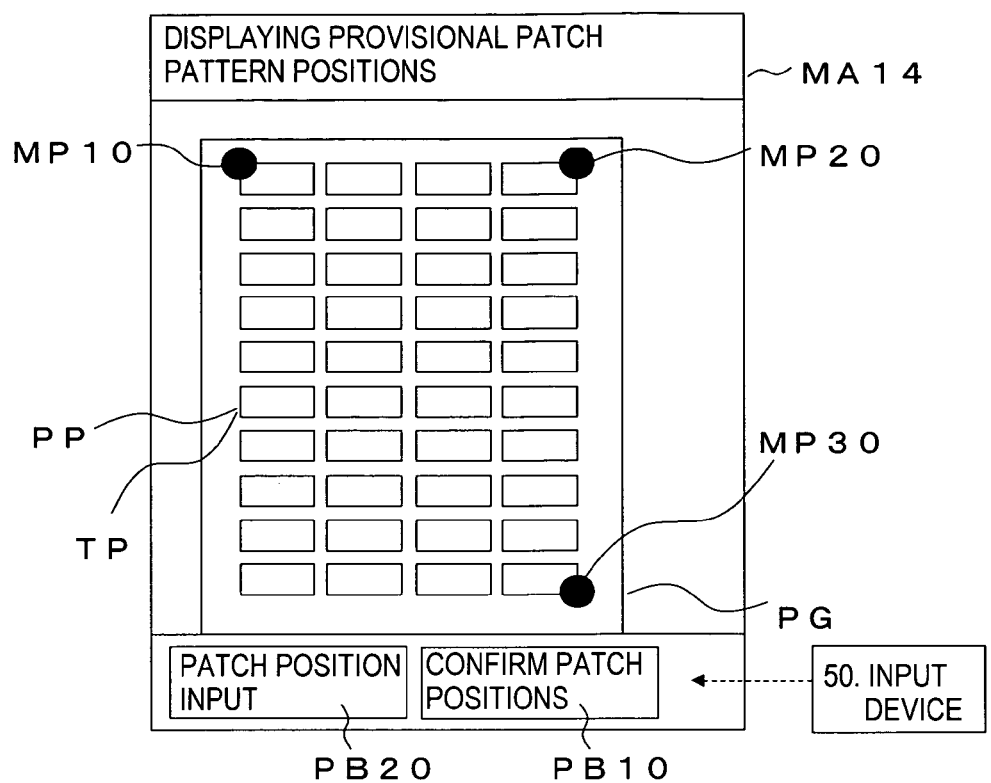
FIG. 6 shows an example of a display screen for a provisional patch pattern position displayed by the image display device 40.
Figure 6B:
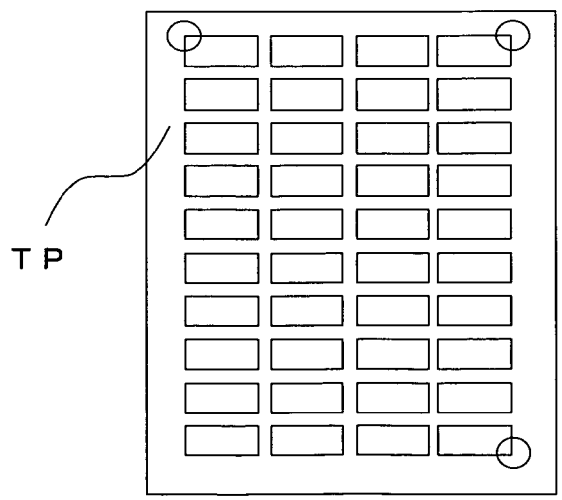

Next, the calibrator 14 forms an image in which the detected provisional patch pattern positions are overlaid on the patch sheet image PG, and this image is displayed on the image display device 40 (step S9). FIG. 6 shows an example of a display screen for a provisional patch pattern position which is displayed on the image display device 40. In FIG. 6A shows the display screen; here, the provisional patch pattern position detection is performed correctly, and the provisional patch pattern positions TP coincide with the images of patch patterns PP in the patch pattern image PG. In FIG. 6B, only the provisional patch pattern positions TP are displayed.

This FIG. 6 is used to again explain the above-described processing to detect provisional patch pattern positions TP. As explained above, the marker patches MP10, MP20, MP30 are generated from colors or gradation values different from those of the patch patterns, and so images matching the colors or gradation values of the marker patches are detected, and the positions are taken to be the positions of the marker patches MP10 to MP30. Thereafter, the marker patches MP and the patch pattern images are in a fixed positional relation, and so the position of each of the patch patterns are detected based on the positions of the marker patches MP. Then, a lattice shape such as for example that shown in FIG. 6B is used to generate the provisional patch pattern positions TP to be displayed.

When the provisional patch pattern position display screen is thus displayed, the user judges whether the currently detected provisional patch pattern positions TP on this screen are correct (step S10). In other words, the user decides whether calorimetric values for each of the patch patterns of the patch sheet P-S can be acquired based on the patch pattern positions detected (recognized) at this time.

When as a result of this confirmation (judgment) the provisional patch pattern positions TP are correct (Yes in step S10), as in the case shown in FIG. 6A, the user issues an instruction (request) for acquisition of the calorimetric value of each patch pattern based on these patch pattern positions TP (step S14). Specifically, the user clicks on the "Confirm patch positions" icon PB10 displayed at the bottom of the screen shown in FIG. 6A, using the input device 50.

If on the other hand the provisional patch pattern positions TP are not correct (No in step S10), the user issues a request of input for modification of the provisional patch pattern positions TP, in order to detect the correct positions (step S11).

Figure 7:
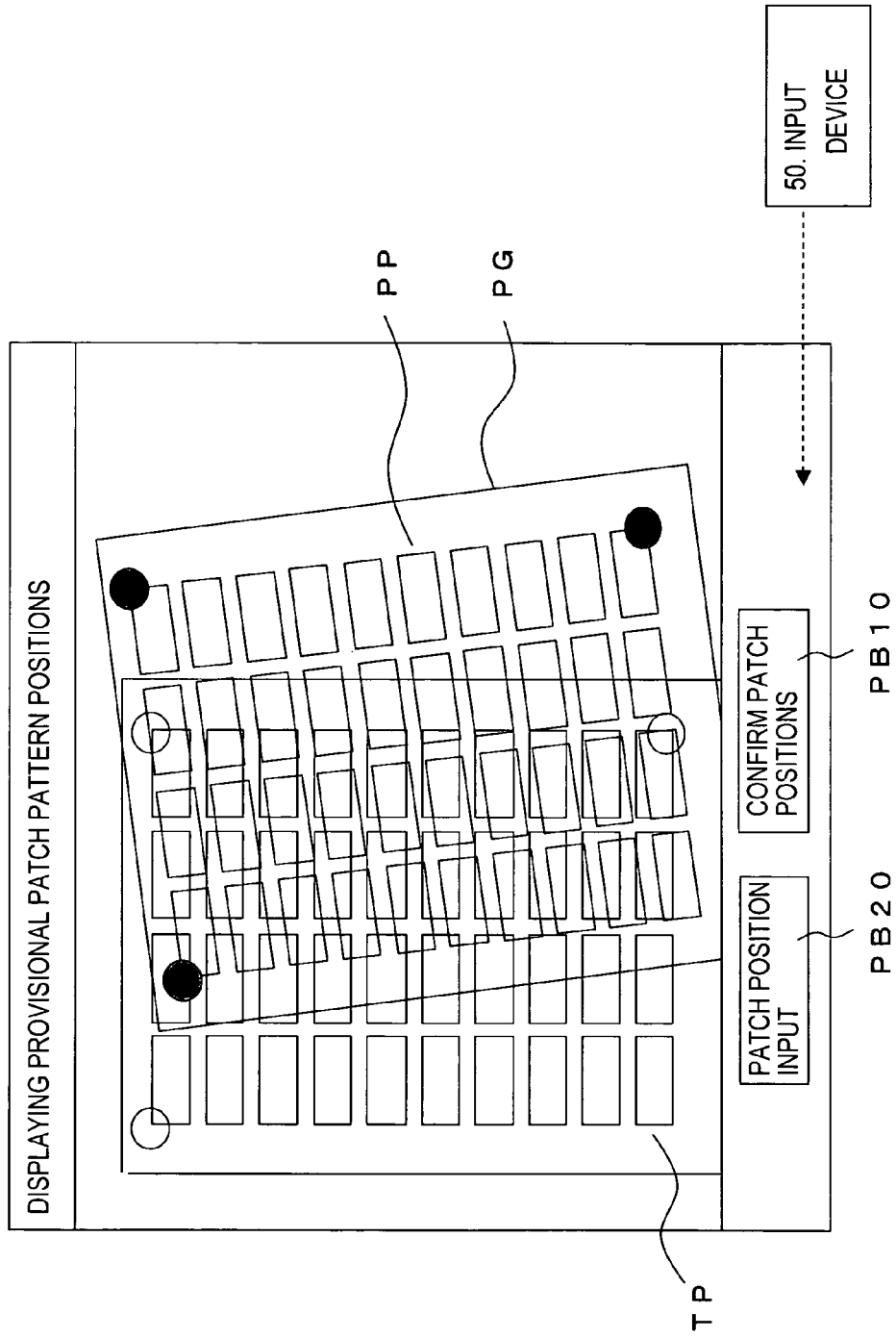
FIG. 7 shows an example of a display screen for a provisional patch pattern position, when detection of a provisional patch pattern position is not performed accurately.

FIG. 7 shows an example of a provisional patch pattern position display screen when the detection of provisional patch pattern positions has not been performed accurately. In the example shown, the positions of the actual patch patterns PP and the provisional patch pattern positions TP are displayed with a deviation therebetween, and the user can easily confirm visually that the provisional patch pattern positions are not accurately detected. In such a case, by using the input device 50 to click on the "Patch position input" icon PB20 displayed at the bottom of the screen in FIG. 7, an input request for modification is issued, and the calibrator 14 is instructed to begin patch pattern position input processing in which the user manually inputs the positions of patch patterns.

Figure 8:
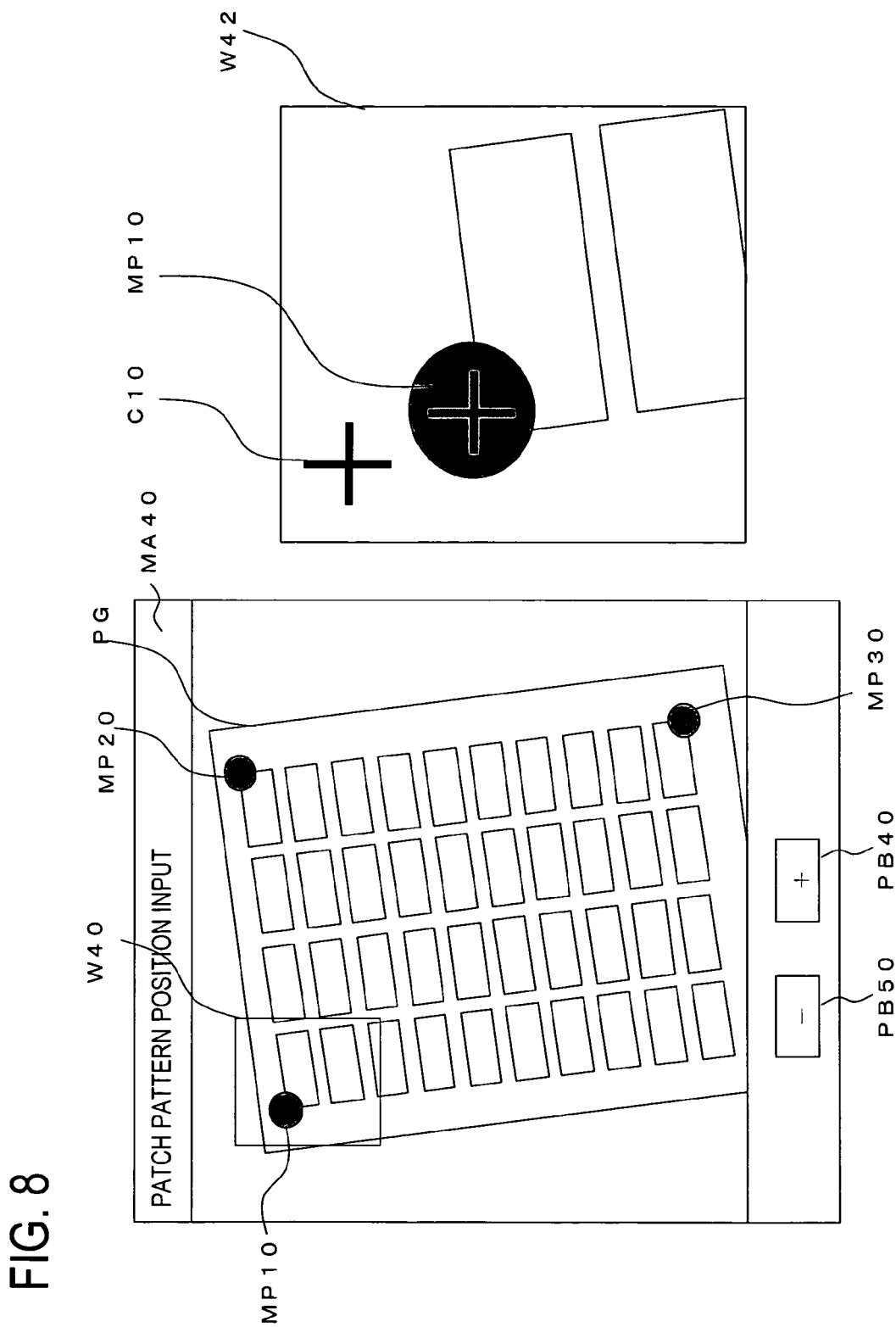
FIG. 8 shows an example of an input screen (patch pattern position input screen) when the user inputs a provisional patch pattern position.

Upon receiving this input request, the calibrator 14 displays a patch pattern position input screen on the image display device 40 (step S12). FIG. 8 shows an example of an input screen (patch pattern input screen) for a case in which the user inputs provisional patch pattern positions. In the example shown in FIG. 8, as the patch pattern position input, the calibrator 14 prompts the user to select the marker patches MP10, MP20 and MP30 which serve as references for patch pattern position detection, based on the patch sheet image PG. At this screen, in order to facilitate recognition of the marker patches MP10, MP20, MP30 on the patch sheet image PG, for example, the patch sheet image PG may be displayed only as outlines, while the marker patches MP10, MP20, MP30 are displayed in color. In addition, an instruction message prompting selection of marker patches may be displayed in the display area MA40. By thus prompting the user to select marker patches, input by the user is facilitated. Here, marker patches are selected; but the user can instead operate a mouse or similar to specify arbitrary points on the displayed patch sheet image PG to input (select) the positions of patch patterns PP.

Next, the user inputs the patch positions at the input screen thus displayed (step S13). In the example shown in FIG. 8, rather than the patch positions, the positions of marker patches are input (selected). In this example, more specifically, first mouse operations are performed to move a frame W40 in order to select a marker patch which serves as reference for detection of positions on the patch sheet image PG, and when the target marker patch MP10 is captured within the frame, a mouse click or other operation is used to fix the position of the frame W40.

Then, the image within the range of the frame W40 is enlarged and displayed in a screen W42 separate from the screen displaying the patch sheet image PG. By this means, the user can simultaneously confirm both the positional relations in the entire patch sheet image PG and the image enlarged in the selected range, so that operations can be performed smoothly, and selection of marker patch positions can be performed accurately. The "+" icon PB40 and "−" icon PB50 displayed at the bottom of the screen can be clicked to adjust the magnification within the frame W42.

Next, the user uses the mouse to move the cursor C10 within the range of the screen W42, and when the position of the marker patch MP10 and the position of the cursor C10 overlap, clicks the mouse. Through this operation, the marker patch MP10 is selected, and the position is input to the calibrator 14. Subsequently, similar operations are performed to select the marker patches MP20 and MP30, and the accurate positions of three marker patches MP can be input to the calibrator 14.

When the above input processing is performed, the calibrator 14 detects the positions of the patch patterns PP, which are in a prescribed positional relation with the input marker patch positions, and determines the provisional patch pattern positions based on the detection results (step S8); then the provisional patch pattern positions TP and the patch sheet image PG are overlaid and again displayed on the image display device 40 (step S9).

In this way, provisional patch pattern positions TP are repeatedly detected based on user input and displayed, until the user judges that the provisional patch pattern positions TP are correct (Yes in step S10).

Upon confirmation that the provisional patch pattern positions TP are correct (Yes in step S10), an instruction (request) is issued to acquire calorimetric values for each of the patch patterns based on the provisional patch pattern positions TP, as described above (step S14). Upon receiving this request, the calibrator 14 first finalizes the patch pattern positions using the provisional patch pattern positions TP at that time, and displays the patch pattern position finalization screen on the image display device 40.

Figure 9:
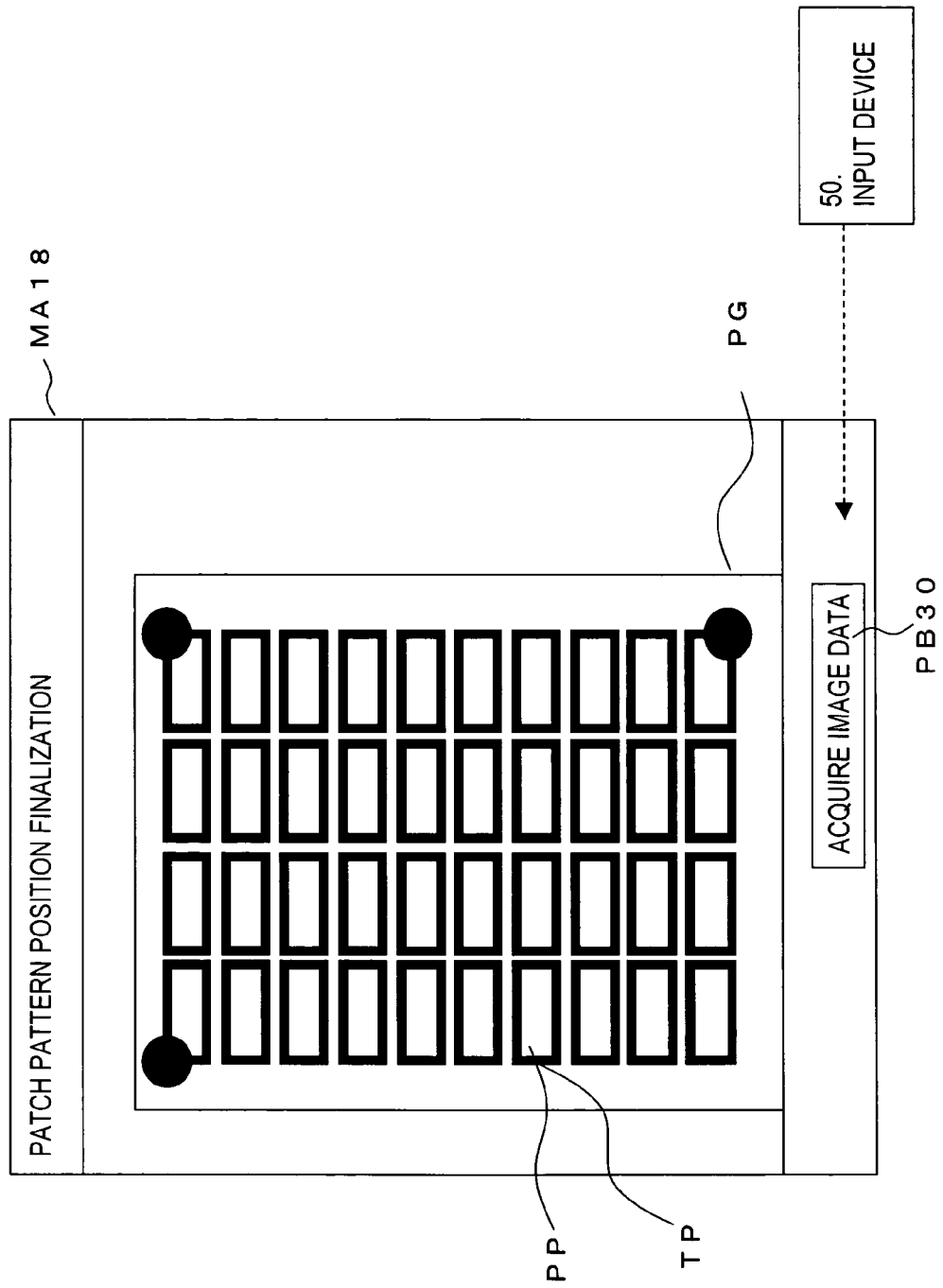
FIG. 9 shows an example of a patch pattern position confirmation screen.

FIG. 9 shows an example of a patch pattern position finalization screen. As shown in FIG. 9, the finalized patch pattern positions (outlines of patch patterns) are displayed using bold lines on this screen. By this means, the user can confirm that the patch pattern positions have been finalized. In this screen, a display area MA18 may be provided in an area which does not overlap with the patch sheet image PG, and "Patch pattern position finalization" or other processing content may be displayed.

As explained above, upon clicking on the "Confirm patch positions" icon PB10 in the screen shown in FIG. 6, an instruction is issued to acquire calorimetric values for each patch pattern; but an instruction may instead be issued to acquire calorimetric values after the user reconfirms positions on the patch pattern position finalization screen. In this case, by clicking on an "Acquire image data" icon PB30 displayed at the bottom of the screen shown in FIG. 9, the user issues the instruction.

Next, the calibrator 14 acquires calorimetric values for each patch pattern of the patch sheet P-S, based on the finalized positions (step S15). Specifically, in the image data of the patch sheet P-S supplied from the scanner 30, one measured value (colorimetric value) is acquired for each patch pattern by performing processing to for example average the RGB values for each pixel positioned within each finalized patch pattern position, that is, within the finalized area of each patch pattern.

Figure 10:
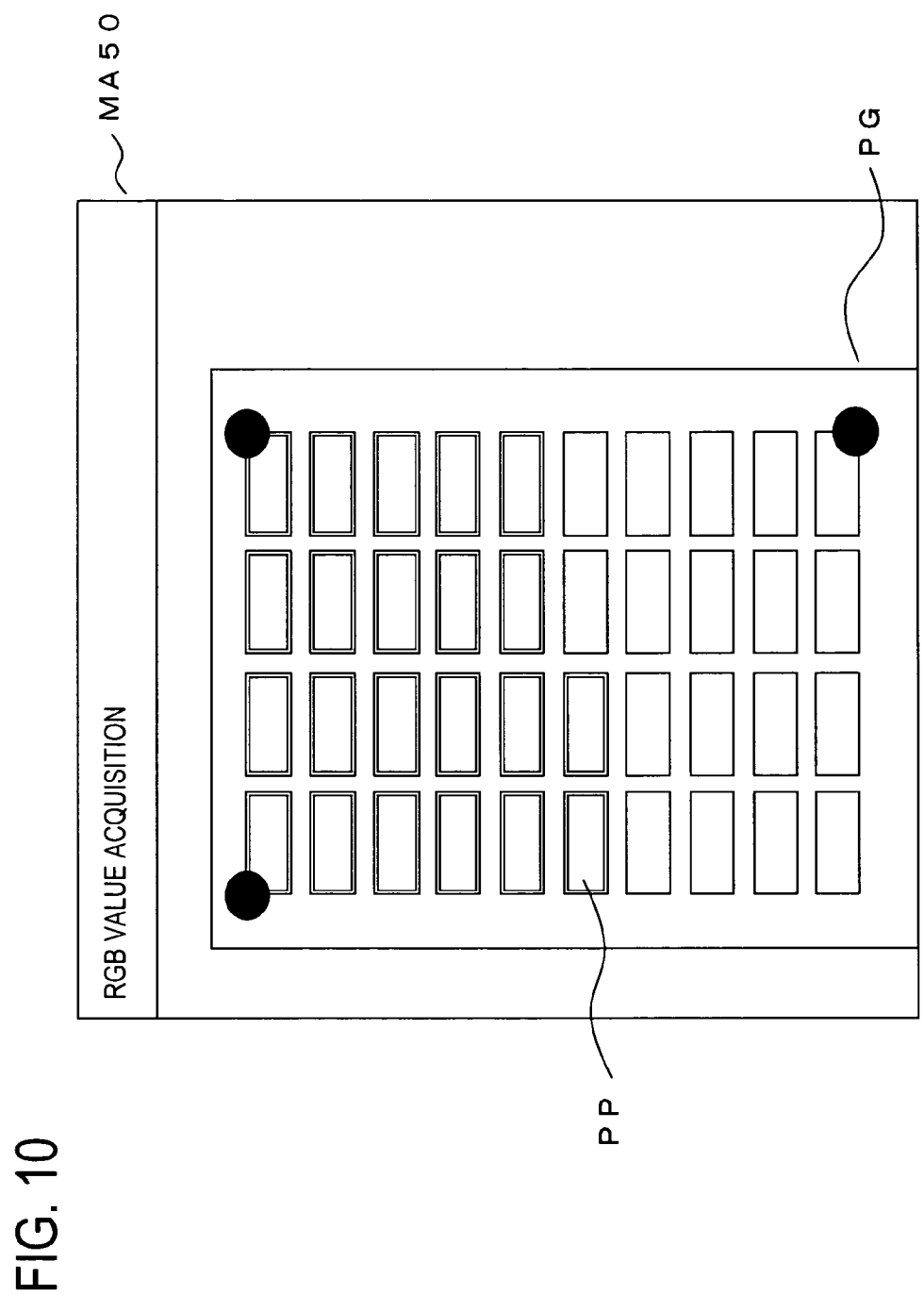
FIG. 10 shows an example of a screen displayed on an image display device 40 by a calibrator 14 during processing to acquire calorimetric values.

FIG. 10 shows an example of a screen displayed on the image display device 40 by the calibrator 14 during processing to acquire calorimetric values. In the example of FIG. 10, calorimetric value acquisition has been completed for the patch patterns indicated by the double-outlines, and processing has not yet been performed for patch patterns displayed by single lines. By means of such a display, the user can grasp the state of progress of processing. In this screen, a display area MA50 is provided which does not overlap with the patch sheet image PG, and "RGB value acquisition" or other processing content may be displayed.

Next, the calibrator 14 performs processing to convert the acquired calorimetric values into Lab values (step S16). As described above, the acquired calorimetric values are the RGB signals from a scanner 30, and so are converted into device-independent Lab values using a prescribed function in order to enable comparison with the above-described standard data 17.

Figure 11:
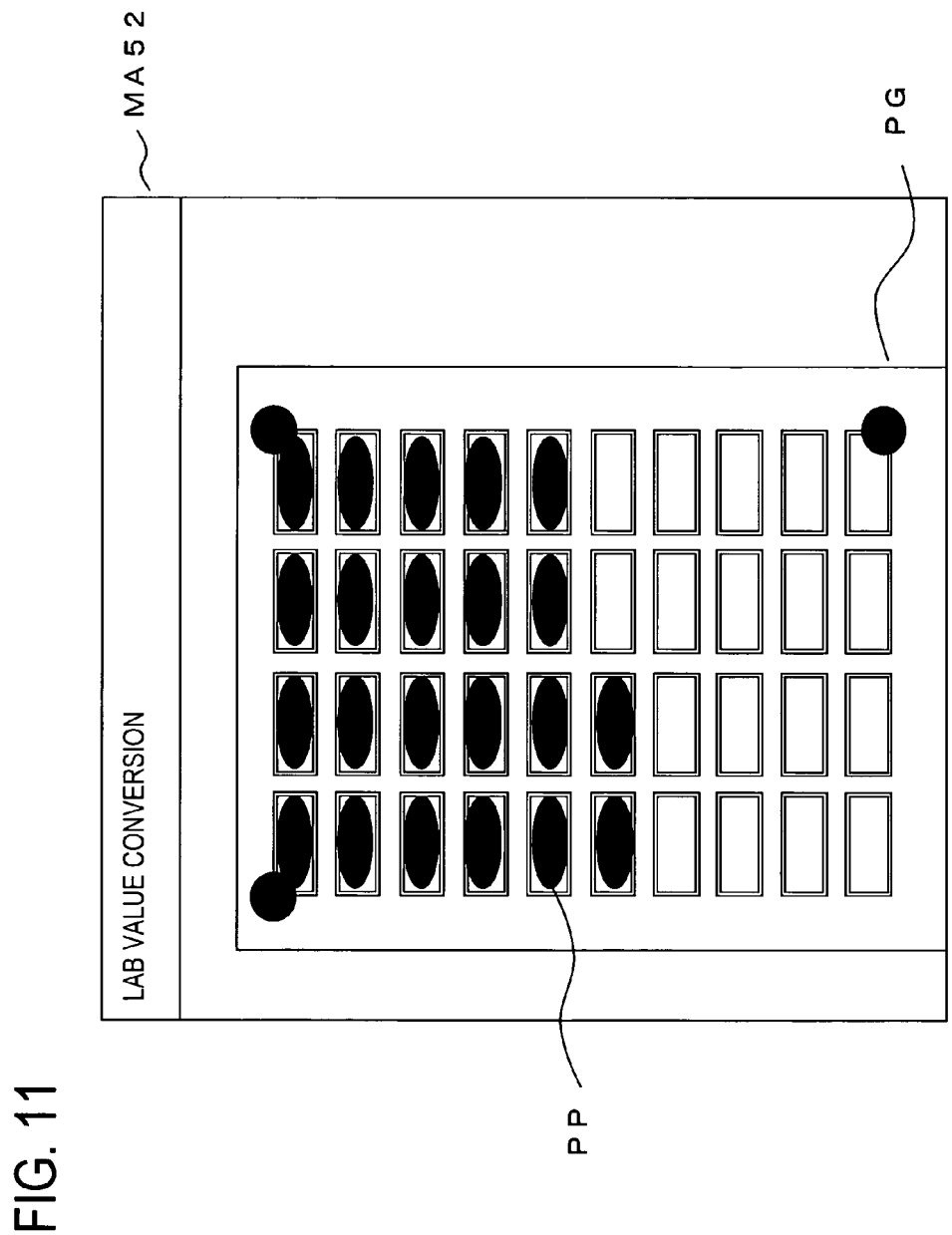
FIG. 11 shows an example of a screen displayed on an image display device 40 by a calibrator 14 during Lab conversion processing; and, FIG. 12 is a drawing used to explain updating of a color correction table 18.

FIG. 11 shows an example of a screen displayed on the image display device 40 by the calibrator 14 during conversion processing. In the example shown in FIG. 11, at the time of completion of conversion to Lab values for each patch pattern, an ellipse-shaped icon in a color different from the patch pattern is displayed overlapping the patch pattern; by this means, the user can grasp the state of progress of processing. Further, a display area MA52 not overlapping the patch sheet image PG may be provided, and "Lab value conversion" or other processing content may be displayed.

When Lab format calorimetric values are acquired in this way, the calibrator 14 then constructs a correspondence relation between the original gradation values for each patch pattern, that is the CMYK gradation values of the patch sheet data 16, and the calorimetric values. More specifically, for each gradation value used to generate a patch pattern for a color, the calorimetric values measured for the corresponding patch pattern are associated. For example, for a C gradation value of 7, the calorimetric values L, a, and b for the corresponding generated patch pattern are associated. Similar associations are made for other colors and gradation values, so that colorimetric values L, a, and b are associated with gradation values from 0 to 255 for each CMYK color. Patch patterns are generated for gradation values at prescribed intervals (in the example of FIG. 3, every seven gradation values) as explained above, so that the correspondence relation between gradation values and calorimetric values will be discontinuous; but interpolation between data points can be performed to obtain a more dense table. This interpolation may be performed when generating the color correction table, described below.

Next, the calibrator 14 compares the correspondence relation constructed between the gradation values and the calorimetric values with the standard data 17 (step S17). As explained above, the standard data 17 is data indicating the density (color value) which should actually be output for each gradation value, and is data in the same format as the correspondence relation, constructed above, between gradation values and colorimetric values. Hence by comparing the two, the calibrator 14 can identify differences between the correspondence relation constructed between gradation values and calorimetric values, and the standard data 17. Specifically, differences between the colorimetric values L, a, b and the values L, a, b of the standard data 17 for each gradation value and each color are detected.

Then, based on these differences, the calibrator 14 generates the color correction table 18 such that printing is performed with the target values indicated by the standard data 17 for each color and each gradation value (step S18). This table is then substituted for the color correction table 18 which had been used until that time. When there are the differences described above between the calorimetric values acquired from the patch sheet P-S and the standard data 17, prior to processing by the printing engine 24 of the printer 20, the gradation values of the original image data must be converted into gradation values such that the standard data values corresponding to the original gradation values result; the color correction table 18 serves this purpose, and the gradation values after the above conversion are determined based on the detected differences.

Figure 12:
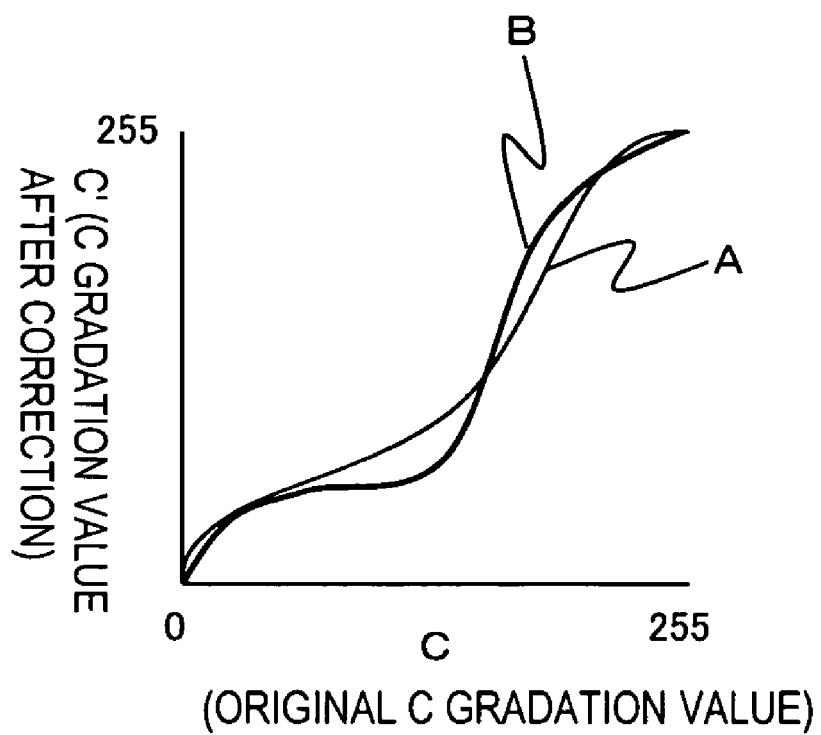

FIG. 12 is a drawing used to explain updating of a color correction table 18. In FIG. 12, similarly to the case of FIG. 2, the color correction table 18 for the color C is displayed as a graph, in which the horizontal axis indicates the original C gradation value (C) and the vertical axis indicates the corrected (converted) C gradation value (C'). The curve A in the figure represents the relation between C and C' in the original color correction table 18, and the curve B represents the relation between C and C' in the updated color correction table 18.

In this way, a new color correction table 18 is generated, and is stored in a prescribed location, and calibration processing ends; during subsequent printing, the newly generated color correction table 18 is used in the above-described color correction processing (CMYK data→C'M'Y'K' data) (in the example of FIG. 12, curve B is used), and printing is properly performed with the target values until the density characteristic of the printer 20 changes.

In this embodiment, data expanded into the CMYK colors which are the toner colors used in the printer 20 is subjected to color correction processing to perform correction prior to printing such that the output density is appropriate for the original image gradation values; however, the timing with which this color correction processing is performed is not thereto limited, and for example may be performed on RGB data prior to the above-described color conversion processing. Or, color correction processing may be performed together with the color conversion processing (RGB data→CMYK data). The processing may also be performed as part of the screening processing performed by the printer 20. Hence in these cases, the calibration results, that is, the relation between gradation values and calorimetric values, differences with the standard data 17, gradation values after conversion and similar, are used in formats according to each color conversion processing.

In this embodiment, the color correction table 18 is held on the side of the host computer 10; but the table may be provided on the side of the printer 20. In this case, the printer driver 12 of the host computer 10 transmits the CMYK data prior to color correction, and color correction processing is performed in the control unit 22 of the printer 20. In this case also, the above calibration processing is similarly performed, primarily by the calibrator 14.

In the above described FIG. 9 through FIG. 11, an example was described in which the mode of display of the patch patterns changed according to the state of progress of processing; however, other methods may be used, and any display mode may be employed in which the user can visually confirm changes in processing. Moreover, the timing of changes in the display mode is also not limited to that described above.

In this embodiment, users input instructions by using a mouse to click on displayed button icons; in place of this, however, input may be assigned to the function keys of a keyboard, and the assigned contents may be displayed on the screen on the image display device 40.

In this embodiment, as the method of color representation, the CMYK colors used by the printer 20, the RGB colors used by the scanner 30, Lab values, and similar are employed; but other methods may be used, and other methods of representing the gradation values of printing data and the measured densities of output may be employed.

As explained above, in the calibration system 1 of this embodiment during position detection when acquiring calorimetric values for each of the patch patterns of an output patch sheet P-S, image data for the patch sheet P-S read out by the scanner 30 and the results of position detection are displayed to the user for confirmation, and an input interface for modification is prepared for cases in which modification is necessary. Hence when erroneous position detection is performed by the calibrator, whether due to poor output of the patch sheet P-S, or shifting of the patch sheet P-S during readout by the scanner, or low precision of the scanner reading, a human can perform appropriate modification before acquiring calorimetric values; hence there is no execution of calibration using inaccurately detected patch pattern positions as in the prior art, and the precision of calibration can be improved.

Further, in the input interface of this calibration system 1, a screen displaying the entire patch sheet P-S and a screen displaying in enlargement an area of operation are displayed simultaneously, so that the user can easily and accurately input modification instructions.

As indicated in FIG. 9 through FIG. 11, in this calibration system 1 the mode of display of patch patterns changes according to the state of progress of processing, so that the user can graphically perceive the progress of processing, and can easily and accurately grasp the state of processing.

In this calibration system 1, the calibrator 14, printer 20 which outputs the patch sheet P-S, and scanner 30 which reads in the patch sheet P-S are provided as separate devices; but a configuration may be employed in which the image formation device which is the object of calibration comprises the functions of all these devices. For example, a configuration as a so-called all-in-one device, which combines the functions of a printer, scanner, and photocopier, may be employed. In this case, calibration processing is similarly performed.

A configuration may also be employed in which the scanner 30 in the calibration system 1 is replaced with a digital camera. In this case, calibration processing is similarly performed. If the digital camera and the calibrator 14 are connected by a cable or otherwise in a state enabling communication, image data of the patch sheet P-S captured by the digital camera can be automatically input to the calibrator 14; and when communication is not possible, the captured image data can be manually supplied to the calibrator 14.

What is claimed is:

1. A non-transitory computer readable medium recording a calibration program, which causes a control device to execute calibration processing of reading as image data a patch sheet output from an image formation device, having a plurality of patch patterns formed as images based on different density-gradation value data and a marker patch formed from colors or gradation values different from those of the patch patterns, acquiring colorimetric values for each of said patch patterns from the read-out image data, and adjusting the density of said image formation device based on said density-gradation values and said acquired colorimetric values for each of said patch patterns;

said program causing said control device to execute:
displaying said read-out image data of said patch sheet;
detecting a position of said marker patch;
detecting and displaying a region from which the colorimetric values for each of said patch patterns are acquired, based on said position of said marker patch, after the displaying of said read-out image data, and before any operation of a user; and,
acquiring the colorimetric values for each of said patch patterns based on said displayed region, after confirmation input by the user of said displayed region,
wherein, after said detecting and displaying the region from which the colorimetric values are acquired, said program further causes said control device to execute:
displaying a screen for receiving input from the user to modify said displayed region in response to an instruction of the user; and,
detecting and displaying again the region, based on the input by said user at said screen displayed, and
wherein said screen displayed for receiving input has at least two areas for different display ranges both of which display image data for said patch sheet, and one of said areas displays the enlarged image of the selected range in an other of said areas.

2. The non-transitory computer readable medium according to claim 1, wherein said input by the user at the screen displayed is input of the position of said marker patch in said image data of the patch sheet.

3. The non-transitory computer readable medium according to claim 1, wherein, in the processing of said acquiring the colorimetric values, said patch patterns are displayed to the user, and the display mode of the patch patterns is changed according to the state of progress of processing.

4. A calibration system, comprising:
an image formation portion, which outputs a patch sheet having a plurality of patch patterns formed as images based on different density-gradation value data and a marker patch formed from colors or gradation values different from those of the patch patterns;
a patch sheet readout portion, which reads said patch sheet as image data; and,
a calibration portion which displays said read-out image data for patch sheet, detects a position of said marker patch, detects and displays a region from which colorimetric values for each of said patch patterns are acquired, based on said position of said marker patch, after said read-out image is displayed and before any operation of a user, acquires the colorimetric values for each of said patch patterns based on said displayed region after confirmation input by the user of said displayed region, and performs density adjustment of said image formation portion based on said density-gradation values and said colorimetric values acquired for each of said patch patterns,
wherein, after detecting and displaying the region from which the colorimetric values are acquired, said calibration portion displays a screen for receiving input from the user to modify said displayed region in response to an instruction of the user and, detects and displays again the region, based on the input by said user at said screen displayed, and
wherein said screen displayed for receiving input has at least two areas for different display ranges both of which display image data for said patch sheet, and one of said areas displays the enlarged image of the selected range in an other of said areas.

5. A calibration method, in which a patch sheet output from an image formation device, having a plurality of patch patterns formed as images based on different density-gradation value data and a marker patch formed from colors or gradation values different from those of the patch patterns, is read as image data, colorimetric values are acquired for each of said patch patterns from the read-out image data, and based on said density-gradation values and said acquired colorimetric values for each of said patch patterns, density adjustment of said image formation device is performed, comprising:
displaying to a user said read-out image data of said patch sheet;
detecting a position of said marker patch;
detecting and displaying a region from which the colorimetric values for each of said patch patterns are acquired, based on said position of said marker patch, after said displaying of said read-out image data and before any operation of a user; and,
acquiring colorimetric values for each said patch pattern based on said displayed region, after confirmation input by the user of said displayed region,
wherein, after said detecting and displaying the region from which the colorimetric values are acquired, displaying a screen for receiving input from the user to modify said displayed region in response to an instruction of the user; and,
detecting and displaying again the region, based on the input by said user at said screen displayed, and
wherein said screen displayed for receiving input has at least two areas for different display ranges both of which display image data for said patch sheet, and one of said areas displays the enlarged image of the selected range in an other of said areas.

* * * * *